(12) United States Patent
Maddukuri et al.

(10) Patent No.: US 11,334,137 B2
(45) Date of Patent: *May 17, 2022

(54) SYSTEM AND METHOD TO MAINTAIN OPTIMAL SYSTEM PERFORMANCE WHILE ADHERING TO COMPETING POWER CAP POLICIES

(71) Applicant: DELL PRODUCTS L.P., Round Rock, TX (US)

(72) Inventors: Akkiah Choudary Maddukuri, Austin, TX (US); Arun Muthaiyan, Round Rock, TX (US); Dit Charoen, Round Rock, TX (US); John Erven Jenne, Austin, TX (US); Sunil Kumar Gattu, Cedar Park, TX (US); Jun Gu, Austin, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/194,997

(22) Filed: Mar. 8, 2021

(65) Prior Publication Data
US 2021/0208661 A1 Jul. 8, 2021

Related U.S. Application Data

(63) Continuation of application No. 16/038,260, filed on Jul. 18, 2018, now Pat. No. 10,942,557.

(51) Int. Cl.
*G06F 1/32* (2019.01)
*G06F 1/3206* (2019.01)
*G06F 1/20* (2006.01)
*G06F 1/3234* (2019.01)

(52) U.S. Cl.
CPC ............ *G06F 1/3206* (2013.01); *G06F 1/206* (2013.01); *G06F 1/3234* (2013.01); *G06F 2201/86* (2013.01)

(58) Field of Classification Search
CPC ................. G06F 1/32; G06F 1/12; G06F 9/44
See application file for complete search history.

(56) References Cited

U.S. PATENT DOCUMENTS

| 8,230,245 | B2 | 7/2012 | Khatri et al. |
| 8,457,805 | B2 | 6/2013 | Bieswanger et al. |
| 8,458,499 | B2 | 6/2013 | Brey et al. |
| 8,713,490 | B1 | 4/2014 | Allen-Ware et al. |
| 8,838,286 | B2 | 9/2014 | Florez-Larrahondo et al. |
| 9,066,286 | B2 | 6/2015 | Buesker et al. |
| 9,247,440 | B2 | 1/2016 | Ho et al. |
| 9,310,424 | B2 | 4/2016 | Allen-Ware et al. |

(Continued)

*Primary Examiner* — Keshab R Pandey
(74) *Attorney, Agent, or Firm* — Jackson Walker LLP; Christopher J. Rourk

(57) ABSTRACT

A system for setting a power cap state is disclosed. The system includes a plurality of power monitor sensors generating power monitor sensor data and a plurality of thermal monitor sensors generating thermal monitor sensor data. A controller has a plurality of inputs configured to receive the power monitor sensor data and the thermal monitor sensor data, to assign a priority to one of two or more power cap states and to generate a control signal. A power limiting circuit coupled to the controller is configured to receive the control signal and to modify one or more power settings.

20 Claims, 2 Drawing Sheets

(56) References Cited

U.S. PATENT DOCUMENTS

| | | | |
|---|---|---|---|
| 9,543,787 B2 | 1/2017 | Duchesneau | |
| 9,811,143 B2 | 11/2017 | Eastep et al. | |
| 9,829,902 B2 | 11/2017 | Eastep et al. | |
| 9,857,856 B2 | 1/2018 | Ragupathi et al. | |
| 9,958,931 B2 | 5/2018 | Morad | |
| 9,971,391 B2 | 5/2018 | Bodas et al. | |
| 2008/0178019 A1 | 7/2008 | McGrane | G06F 1/26 713/320 |
| 2008/0307134 A1* | 12/2008 | Geissler | G06F 13/4291 710/110 |
| 2011/0082591 A1 | 4/2011 | Micka | H04L 67/125 700/276 |
| 2011/0173465 A1 | 7/2011 | Akers | G06F 1/329 713/310 |
| 2012/0096248 A1* | 4/2012 | McCarthy | G06F 1/3203 713/1 |
| 2015/0067377 A1 | 3/2015 | Park | G06F 1/3212 713/340 |
| 2016/0179117 A1* | 6/2016 | Eastep | G06F 1/3296 700/291 |
| 2017/0195408 A1* | 7/2017 | Wu | G06F 9/5094 |
| 2017/0315724 A1 | 11/2017 | Colgrove | G06F 3/0662 |

\* cited by examiner

SYSTEM AND METHOD TO MAINTAIN OPTIMAL SYSTEM PERFORMANCE WHILE ADHERING TO COMPETING POWER CAP POLICIES

CROSS-REFERENCE TO RELATED APPLICATIONS

The present application is a continuation of U.S. patent application Ser. No. 16/038,260 filed Jul. 18, 2018, which is hereby incorporated by reference for all purposes as if set forth herein in its entirety.

TECHNICAL FIELD

The present disclosure relates generally to controlling system power consumption, and more specifically to a system and method for maintaining optimal system performance while adhering to competing power cap policies.

BACKGROUND OF THE INVENTION

Different components of complex systems, such as servers, can have different power control policies. Undesired component interactions can result in oscillation of such power control policies or other unwanted behavior.

SUMMARY OF THE INVENTION

A system for setting a power cap state is disclosed. The system includes a plurality of power monitor sensors generating power monitor sensor data and a plurality of thermal monitor sensors generating thermal monitor sensor data. A controller has a plurality of inputs configured to receive the power monitor sensor data and the thermal monitor sensor data, to assign a priority to one of two or more power cap states and to generate a control signal. A power limiting circuit coupled to the controller is configured to receive the control signal and to modify one or more power settings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
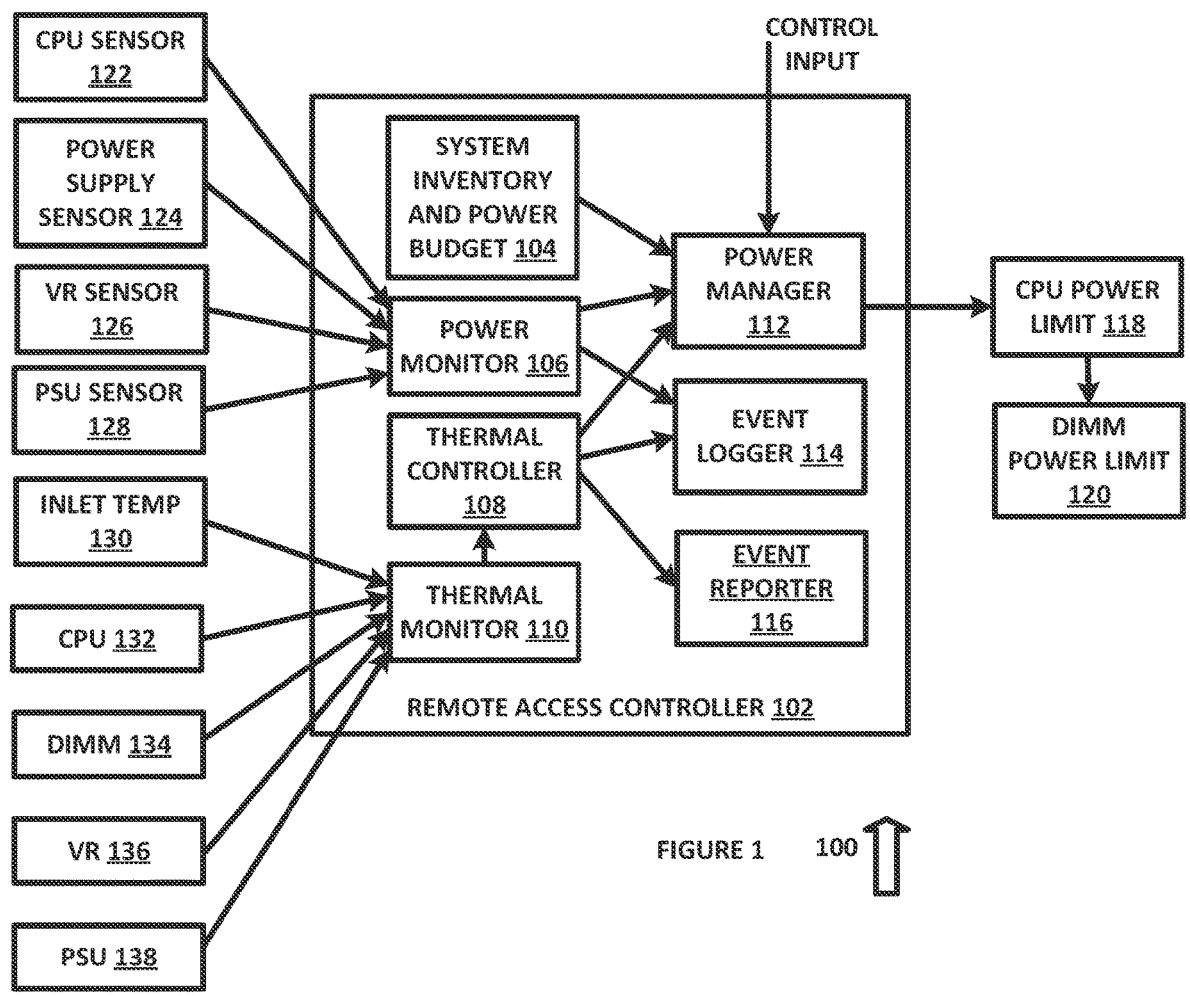
FIG. 1 is a diagram of a system for firmware-based power management, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Servers and other complex, processor-based systems can use power management functions to keep system power and thermal loads within predetermined limits. Because such systems may be provided with one of a number of different power supply sizes as a function of the expected or designed system capacity, the system load typically needs to be kept within a predetermined power envelope that the installed power supplies can support. In addition, the individual system component devices should also be kept within their designed operational temperature range, which can be managed by control of system power levels, in addition to the use of cooling solutions. Furthermore, there may be fixed or dynamically changing power/thermal limits external to the servers that also need to be met, for example, at the circuit breaker level or at the data center level, which can be managed by control of each individual server's power.

Control of power consumption by individual processors can often be used to effectively control system power loading, because they are major loads in the system. In order to effectively use control of power consumption by individual processors in this manner, the appropriate control action (if any) at any given moment needs to be determined, so that all of the noted criteria are satisfied promptly while avoiding undesirable oscillatory behavior and minimizing unnecessary negative performance impact. As part of this control, there will be times when the appropriate control action is to reduce power or to keep power steady, as well as times when the appropriate control action is to raise or remove previously set power limits.

In one example embodiment, a user can set system level power caps to try to maintain overall input power in the power supply, a CPU thermal power cap is used to control overall CPU output power which in-turn affects control of CPU temperature and a system thermal power cap is used to control overall input or output power which in-turn affects control of system temperature. While one of these policies may want to ramp power down and to maintain a steady state, another policy may be trying to step up power. As such, these conflicting policies may cause oscillation. The present disclosure allows multiple policies to be managed without such issues.

In another example embodiment, a method of assigning a different priority for each power capping state is disclosed. In this example embodiment, a predetermined number of power capping states are defined in a controller, such as the integrated Dell Remote Access Controller (iDrac), which is available from Dell.com and also from Dell of Austin Tex., which allows as many levels of priorities as are defined to be used in the system. During the power management process, the controller determines which states the enabled policies are in and from that determines which policy or policies are in the highest of the prioritized states. When there are multiple policies at the same highest priority, if the action of this state is to reduce power, the policy needing the most reduction in power is selected and acted upon. If the action of this state is to keep limit steady, then the policy selection is arbitrary and acted upon. If the action of this state is to raise power, the policy needing the least amount of power to be raised is selected and acted upon.

In another example embodiment, during the power management process, the controller determines which action to take by first determining what function each enabled policy would perform. The controller then determines whether it needs to lower, raise or keep limit steady. Lowering a limit is prioritized over keeping a limit steady, and keeping a limit steady is prioritized over raising the limit. If the controller determines that it needs to lower a limit, it determines and apply the maximum amount from among the enabled policies. If the controller determines that it needs to keep a limit steady, then no action is taken. If the controller determines that it needs to raise a limit, it determines and applies the least amount from among the enabled policies.

The present disclosure thus provides a scalable policy-based control algorithm that provides the technical feature of resolving multiple limit criteria into a specific control action at periodic intervals. Each of the limit criteria can be used to define a distinct policy with a policy power limit, and a policy power input that needs to adhere to the policy power limit. Each policy can then be used to determine whether its power input needs to be lowered, kept steady, raised, or have its limit removed.

A policy is over limit when its power input is or is projected to be greater than its power limit. For example, in a sample method, the algorithm can be characterized as:
PolicyOverLimit=max(0, PolicyPowerInput−PolicyPowerLimit)

As another example, in a linear-extrapolation or first order method, two samples of the power input can be used to project where the power input (and thus the amount that the power is over limit) will be when the slope is positive. Assuming periodic samples where the variable PolicyPowerInput2 is the most recent sample, the over limit requires slightly more computation, such as by using the following example algorithm:
if(PolicyPowerInput2>PolicyPowerInput1){//positive slope PolicyOverLimit=max(0, (2*PolicyPowerInput2−PolicyPowerInput1)−PolicyPowerLimit)
else//flat or negative slope PolicyOverLimit=max(0, PolicyPowerInput2−PolicyPowerLimit)

Higher order extrapolation can be implemented at the cost of additional computation time that will add to the decision duration and create a trade off with the increase in the minimum-possible decision interval.

When a policy is no longer over limit and is now under limit, several possible action can be taken or taken in combination to provide the technical feature of avoiding oscillatory behavior, including:
Adding a delay or pause (i.e., keep limit steady) before raising the limit.
Gradually raising the limit (such as over a number of decision intervals) instead of raising limit all at once.
Parking the limit (i.e., keep limit steady again) for a time once policy's power input has approached the policy's power limit or tracking the power limit and staying just below it during this time.
Removing the limit only if the load has subsided below some threshold.

The amount of limit to raise is determined by how much a policy's power input is lower than its power limit:
PolicyRaiseLimit=max(0, PolicyPowerLimit−PolicyPowerInput)

A positive hysteresis value can be added to further prevent thrashing:
PolicyRaiseLimit=max(0, PolicyPowerLimit−PolicyPowerInput−Hysteresis)

Since the control actions for all of the enabled policies can be funneled to the same devices (typically the CPUs but can also include other high-powered devices), once these actions are determined, they can be prioritized and resolved as to which policy's control action wins at each decision interval. Some example prioritization rules include:
1. A policy with an over limit (i.e., need to lower power) is prioritized higher than a policy without an over limit.
2. If there is more than one policy with an over limit, then the policy with the highest over limit wins since it has the most need.
3. If no policies have over limit:
   a. A policy that needs to keep a limit steady is prioritized higher than a policy that wants to raise a limit.
   b. If no policies need to keep a limit steady and there is more than one policy that wants to raise limit, then the policy that wants to raise limit by the least amount wins.

In summary:
LoadOverLimit=max(all PolicyOverLimit)
if(LoadOverLimit==0){KeepLimitSteady is true whenever any policy does not want the load power to increase LoadRaiseLimit=min(all PolicyRaiseLimit) if KeepLimitSteady is false; else, 0}else{
LoadRaiseLimit=0

As such, the present disclosure provides the technical feature of including a scalable policy-based algorithm for managing system power based on multiple limit criteria that may compete for control action. A power management algorithm is also disclosed that prioritizes lowering a limit over keeping the limit steady, and over raising or removing the limit at the loads. The policy over limit can be determined based on single sample method, based on a 2-sample linear extrapolation method, based on nth-order (n-sample) extrapolation method or in other suitable manners.

The present disclosure also provides a number of other technical features. One technical feature is firmware-based scalable system power management that supports multiple limit criteria. A firmware-based solution ensures that any system configuration or changes to components in a system configuration will not result in undesired modes of operation. Another technical feature is a priority-based algorithm to satisfy multiple limit criteria promptly while avoiding undesirable oscillatory behavior, such as by ensuring that only one selected power policy is enforced at a time.

FIG. 1 is a diagram of a system 100 for firmware-based power management, in accordance with an example embodiment of the present disclosure. System 100 includes remote access controller 102, which further includes system inventory and power budget 104, power monitor 106, thermal controller 108, thermal monitor 110, power manager 112, event logger 114 and event reporter 116, each of which can be implemented in hardware or a suitable combination of hardware and software. System 100 further includes CPU power monitor sensor 122, power supply power monitor sensor 124, voltage regulator (VR) power monitor sensor 126, power supply unit (PSU) power monitor sensor 128, inlet temperature thermal monitor sensor 130, CPU thermal monitor sensor 132, dual inline memory module (DIMM) thermal monitor sensor 134, VR thermal monitor sensor 136 and PSU thermal monitor sensor 138, each of which are coupled to power monitor 106 or thermal monitor 110, respectively, and which can be implemented in hardware or a suitable combination of hardware and software. System 100 also includes CPU power limit system 118 and DIMM power limit system 116, which can be implemented in hardware or a suitable combination of hardware and software.

Remote access controller 102 is a system component that provides remote access control to a complex system, such as a server. In one example embodiment, remote access controller 102 can be an iDRAC or other suitable system components. Remote access controller 102 can include programmable system control functionality and fixed or configurable inputs, to allow it to be dynamically configured to provide the disclosed functionality, such as by providing one or more algorithms as described further herein. In one example embodiment, one or more component systems of remote access controller 102 can be implemented as firmware that can be downloaded to remote access controller 102 and periodically updated.

System inventory and power budget 104 is a system component that can be part of remote access controller 102, another system component or a stand-alone component, and stores data that defines system components that use power and their associated power requirements and loading. In one example embodiment, system inventory and power budget 104 can store a list of CPUs and DIMMs with their current power consumption, thermal loads, maximum power consumption, minimum power consumption, maximum thermal load, minimum thermal load and other suitable data, such as by receiving the data from a control input, by polling individual system components, by receiving the data from intervening system components or in other suitable manners.

Power monitor 106 is a system component that can be part of remote access controller 102, another system component or a stand-alone component, and which monitors power sensors from system components that are received at one or more inputs to remote access controller 102 or other suitable inputs. In one example embodiment, power monitor 106 can receive analog or digital data from CPU power monitor sensor 122, power supply power monitor sensor 124, VR power monitor sensor 126, PSU power monitor sensor 128 or other suitable sensors, and can process the data to generate control signals for use by system inventory and power budget 104, power manager 112, event logger 114 or other suitable systems or components.

Thermal controller 108 is a system component that can be part of remote access controller 102, another system component or a stand-alone component, and which receives inputs from thermal monitor 110 and which generates thermal control signals for power manager 112, event logger 114, event reporter 116 or other suitable systems or components.

Thermal monitor 110 is a system component that can be part of remote access controller 102, another system component or a stand-alone component, and which monitors power sensors from system components that are received at one or more inputs to remote access controller 102 or other suitable inputs. In one example embodiment, thermal monitor 110 can receive analog or digital data from inlet temperature thermal monitor sensor 130, CPU thermal monitor sensor 132, DIMM thermal monitor sensor 134, VR thermal monitor sensor 136 and PSU thermal monitor sensor 138 or other suitable sensors, and can process the data to generate control signals for use by thermal controller 110 or other suitable systems or components.

Power manager 112 is a system component that can be part of remote access controller 102, another system component or a stand-alone component, and which receives control signals from thermal controller 108, power monitor 106 and system inventory and power budget 104 and generates control signals for CPU power limit 118 and DIMM power limit 120, as described herein. In one example embodiment, power manager 112 can select the power cap policy that results in the greatest decrease or lowest increase in power, that has a highest priority or other suitable power cap policies, so as to manage power consumption without creating an oscillatory condition between competing power cap policies.

Event logger 114 is a system component that can be part of remote access controller 102, another system component or a stand-alone component, and which receives control data and other associated data from power monitor 106, thermal controller 108 and thermal monitor 110 and which stores event data associated with the received data.

Event reporter 116 is a system component that can be part of remote access controller 102, another system component or a stand-alone component, and which receives control data and other associated data from thermal monitor 110 and which reports event data associated with the received data.

CPU power monitor sensor 122 is a system component that generates CPU power monitor signals, such as current signals, voltage signals, real power consumption signals, reactive power consumption signals, power quality signals, associated rate of change signals or other suitable signals. The power monitor signals can be digital or analog, can be generated by hardware or a combination of hardware and software/firmware, and can be configured for use with the system and method disclosed herein.

Power supply power monitor sensor 124 is a system component that generates power supply power monitor signals, such as current signals, voltage signals, real power consumption signals, reactive power consumption signals, power quality signals, associated rate of change signals or other suitable signals. The power monitor signals can be digital or analog, can be generated by hardware or a combination of hardware and software/firmware, and can be configured for use with the system and method disclosed herein.

VR power monitor sensor 126 is a system component that generates VR power monitor signals, such as current signals, voltage signals, real power consumption signals, reactive power consumption signals, power quality signals, associated rate of change signals or other suitable signals. The power monitor signals can be digital or analog, can be generated by hardware or a combination of hardware and software/firmware, and can be configured for use with the system and method disclosed herein.

PSU power monitor sensor 128 is a system component that generates PSU power monitor signals, such as current signals, voltage signals, real power consumption signals, reactive power consumption signals, power quality signals, associated rate of change signals or other suitable signals. The power monitor signals can be digital or analog, can be generated by hardware or a combination of hardware and software/firmware, and can be configured for use with the system and method disclosed herein.

Inlet temperature thermal monitor sensor 130 is a system component that generates inlet temperature thermal monitor signals, such as a relative temperature, an absolute temperature, a differential temperature, a temperature rate of change or other suitable data. The thermal monitor signals can be digital or analog, can be generated by hardware or a combination of hardware and software/firmware, and can be configured for use with the system and method disclosed herein.

CPU thermal monitor sensor 132 is a system component that generates CPU thermal monitor signals, such as a relative temperature, an absolute temperature, a differential temperature, a temperature rate of change or other suitable data. The thermal monitor signals can be digital or analog, can be generated by hardware or a combination of hardware and software/firmware, and can be configured for use with the system and method disclosed herein.

DIMM thermal monitor sensor 134 is a system component that generates DIMM thermal monitor signals, such as a relative temperature, an absolute temperature, a differential temperature, a temperature rate of change or other suitable data. The thermal monitor signals can be digital or analog, can be generated by hardware or a combination of hardware and software/firmware, and can be configured for use with the system and method disclosed herein.

VR thermal monitor sensor 136 is a system component that generates VR thermal monitor signals, such as a relative temperature, an absolute temperature, a differential temperature, a temperature rate of change or other suitable data. The thermal monitor signals can be digital or analog, can be generated by hardware or a combination of hardware and software/firmware, and can be configured for use with the system and method disclosed herein.

PSU thermal monitor sensor 138 is a system component that generates PSU thermal monitor signals, such as a relative temperature, an absolute temperature, a differential temperature, a temperature rate of change or other suitable data. The thermal monitor signals can be digital or analog, can be generated by hardware or a combination of hardware and software/firmware, and can be configured for use with the system and method disclosed herein.

CPU power limit system 118 is a system component that receives control signals from power manager 112 and generates CPU power control signals. The CPU power control signals can be digital or analog, can be generated by hardware or a combination of hardware and software/firmware, and can be configured for use with the system and method disclosed herein. In one example embodiment, the CPU power control signals can be used to control one or more different CPUs of a multi-CPU server, or other suitable devices.

DIMM power limit system 116 is a system component that receives control signals from power manager 112 and/or CPU power limit 118, and which generates DIMM power control signals. The DIMM power control signals can be digital or analog, can be generated by hardware or a combination of hardware and software/firmware, and can be configured for use with the system and method disclosed herein. In one example embodiment, the DIMM power control signals can be used to control one or more different DIMMs of a multi-CPU server, or other suitable devices.

In operation, system 100 can be used to control power caps for multiple component systems, as discussed herein. System 100 can be configured to provide the disclosed functionality using one or more algorithms, as discussed herein, and provides the technical feature of being able to determine the power cap policy that should have the highest priority in order to maintain a stable and low temperature system operation.

Figure 2:
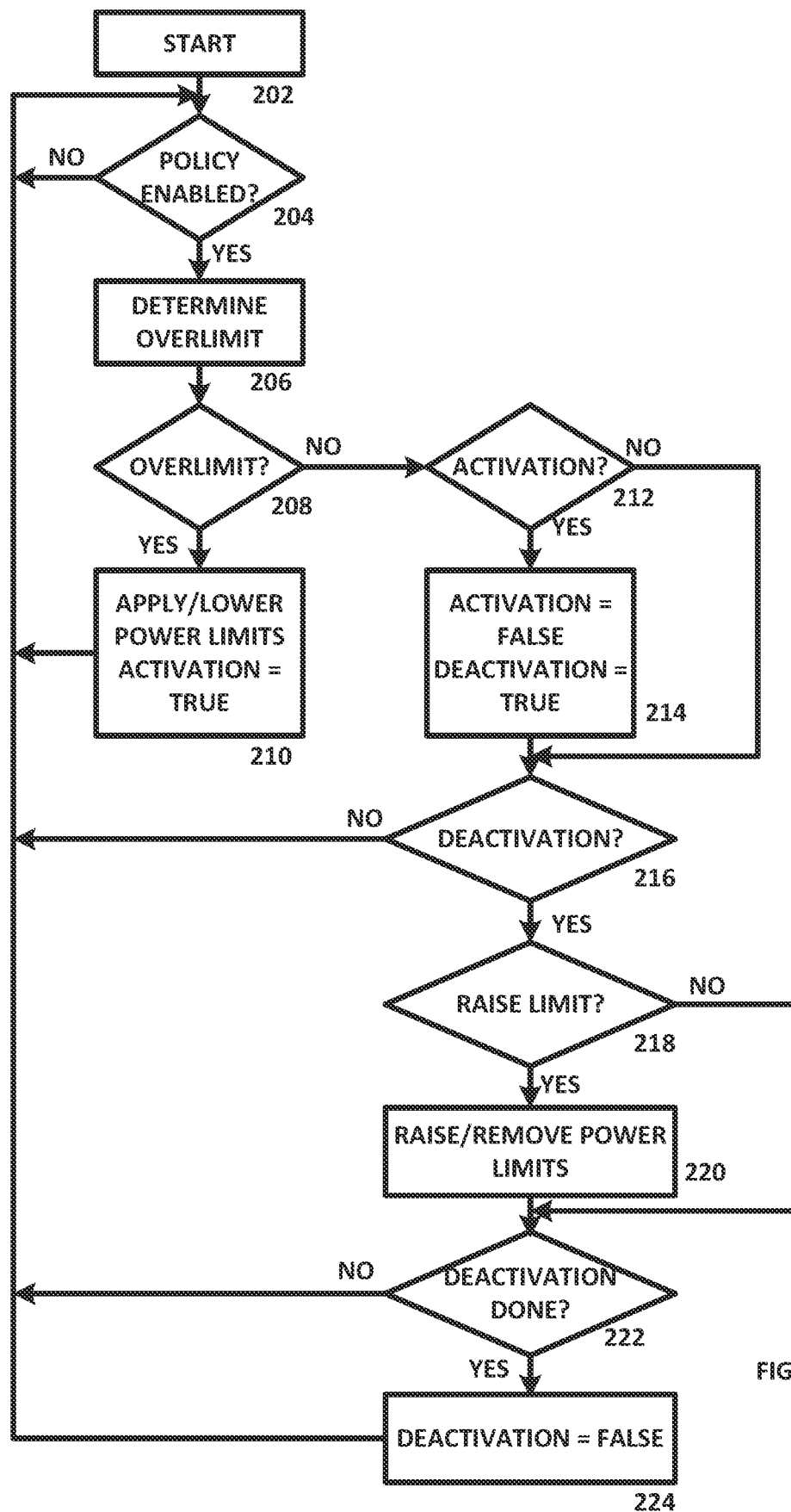
FIG. 2 is a diagram of an algorithm for firmware-based power management, in accordance with an example embodiment of the present disclosure.

FIG. 2 is a diagram of an algorithm 200 for firmware-based power management, in accordance with an example embodiment of the present disclosure. Algorithm 200 can be implemented in hardware or a suitable combination of hardware and software, and can operate on one or more discrete systems or components. In one example embodiment, algorithm 200 provides the technical feature of being dynamically configured to accommodate ad hoc configurations of systems or components and their associated power cap policies.

Algorithm 200 begins at 202 and proceeds to 204, where it is determined whether one or more power cap policies are enabled. In one example embodiment, a power cap policy can be based on a fault protection metric, a power usage metric that is a function of the power that each system component of a complex system is designed to use, a thermal power policy that is based on a thermal load for a system or component, or other suitable metrics. If one or more policies have been enabled, the algorithm proceeds to 206, otherwise the algorithm returns to 202.

At 206, the overlimit that should be applied is determined, as discussed herein. In one example embodiment, the overlimit can be selected from multiple different power cap policies as a function of priority, where the priority is assigned to result in the greatest reduction of power or thermal load, or the lowest increase of power or thermal load. The algorithm then proceeds to 208.

At 208, it is determined whether the power or thermal load exceeds the overlimit amount. If it is determined that the power or thermal load exceeds the overlimit amount, the algorithm proceeds to 210, where the power or thermal load limits are applied and an activation state is set to "true." The algorithm then returns to 202. Otherwise, the algorithm proceeds to 212.

At 212, it is determined whether the activation state is currently set to "true." If not, then the algorithm proceeds to 216, otherwise the algorithm proceeds to 214 where the activation state is set to "false" and the deactivation state is set to "true." The algorithm then proceeds to 216.

At 216, it is determined whether deactivation is set to "true." If it is determined that deactivation is not set to "true," the algorithm returns to 202, otherwise the algorithm proceeds to 218 where it is determined whether a power limit needs to be raised in accordance with a power cap policy having the highest priority. If it is determined that the power limit does not need to be raised (e.g., needs to be kept steady), the algorithm proceeds to 222, otherwise the algorithm proceeds 220 where the power limit is raised or removed. The algorithm then proceeds to 222.

At 222, it is determined whether deactivation has been completed. If it is determined that deactivation has not been completed, the algorithm returns to 202, otherwise the algorithm proceeds to 224 where deactivation is set to "false," and the algorithm then returns to 202.

While algorithm 200 is shown as a flow chart, a person having skill in the art will recognize that algorithm 200 can be implemented as a state machine, in an object-oriented environment or in other suitable manners. Algorithm 200 can also be implemented on a single device or processor, on one or more distributed platforms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system, comprising:
two or more power monitor sensors;
two or more thermal monitor sensors;
a controller coupled to the power monitor sensors and the thermal monitor sensors and configured to receive power monitor sensor data and thermal monitor sensor data, to assign a priority to one of two or more power cap states, each of the power cap states associated with a discrete component, to generate a control signal as a function of the power monitor sensor data and the thermal monitor sensor data and to modify the power cap states to hold a power limit for a predetermined period of time to prevent oscillatory behavior; and
a power limiting circuit coupled to the controller and configured to receive the control signal and to modify one or more of the power cap states.

2. The system of claim 1 wherein the controller comprises a programmable remote access controller that determines a power cap state for one or more voltage regulators.

3. The system of claim 1 wherein the controller is configured to receive a plurality of data identifying system components and associated power budget data for each separate system component and to store the data identifying system components and the associated power budget data.

4. The system of claim 1 wherein the controller is configured to modify a plurality of power limits and to prevent oscillatory behavior resulting from the modification of the plurality of power limits.

5. The system of claim 1 wherein the controller comprises a thermal monitor having a plurality of input ports for a plurality of each of an inlet air temperature, a processor temperature, a memory device temperature, a voltage regulator temperature and a power supply temperature coupled to the plurality of thermal monitor sensors.

6. The system of claim 1 further comprising:
a power monitor having one or more input ports coupled to the plurality of power monitor sensors;
a thermal monitor having one or more input ports coupled to the plurality of thermal monitor sensors; and
a power manager coupled to the system inventory and power budget system, the power monitor and the thermal monitor and configured to dynamically determine a priority for the power cap states to avoid oscillatory behavior of the modification of the power cap states.

7. The system of claim 1 wherein the power limiting circuit comprises a CPU power limiting circuit configured to control a power setting and a thermal setting of each of a plurality of CPUs, and a dual inline memory module (DIMM) circuit configured to control a power setting and a thermal setting of each of a plurality of DIMMs.

8. A method, comprising:
assigning a priority to one of two or more power cap states, each of the power cap states associated with a discrete component, using a programmable remote access controller as a function of power monitor sensor data and thermal monitor sensor data;
generating a control signal using the programmable remote access controller as a function of the power cap state having a highest priority;
receiving the control signal at a power limiting circuit coupled to the programmable remote access controller; and
modifying the power cap state of one of the discrete components using the power limiting circuit to prevent oscillatory behavior.

9. The method of claim 8 wherein the programmable remote access controller receives one or more system component identifiers and associated power budget data, stores the system component identifiers and the associated power budget data, and modifies one of the power cap states to raise a power limit in a predetermined number of steps to prevent the oscillatory behavior.

10. The method of claim 8 wherein the programmable remote access controller receives the power monitor sensor data at an input port and modifies one of the power cap states to hold a power limit for a predetermined period of time to prevent the oscillatory behavior.

11. The method of claim 8 wherein the programmable remote access controller receives the thermal monitor sensor data from one of the plurality of thermal monitor sensors at an input port.

12. The method of claim 8 wherein the programmable remote access controller receives the power monitor sensor data at a first input port, receives the thermal monitor sensor data at a second input port.

13. The method of claim 8 wherein the power limiting circuit controls a power setting and a thermal setting of each of a plurality of CPUs and each of a plurality of DIMMs.

14. A system, comprising:
a controller configured to perform the steps of:
receiving power monitor sensor data and thermal monitor sensor data;
assigning a priority to one of two or more power cap states as a function of the power monitor sensor data and the thermal monitor sensor data;
generating a control signal as a function of the priority;
receiving system component identifier data and associated power budget data;
storing the system component identifier data and the associated power budget data; and
modifying one of the power cap states to raise a power limit in a predetermined number of steps to prevent oscillatory behavior.

15. The system of claim 14 wherein the controller comprises a programmable remote access controller.

16. The system of claim 14 wherein the controller is configured to perform the steps of receiving one or more system component identifiers and associated power budget data and storing the system component identifiers and the associated power budget data.

17. The system of claim 14 wherein the controller comprises a power monitor having one or more input ports coupled to the plurality of power monitor sensors.

18. The system of claim 14 wherein the controller comprises a thermal monitor having one or more input ports coupled to the plurality of thermal monitor sensors.

19. The system of claim 14 further comprising:
a power monitor having one or more input ports coupled to the plurality of power monitor sensors; and
a thermal monitor having one or more input ports coupled to the plurality of thermal monitor sensors.

20. The system of claim 14 wherein the controller is configured to dynamically determine a priority for the power cap state associated with a discrete component.

* * * * *